G. W. BELL.
PNEUMATIC ANTIVIBRATION DEVICE FOR AUTOMOBILES.
APPLICATION FILED OCT. 14, 1910.

1,120,011.

Patented Dec. 8, 1914.
8 SHEETS—SHEET 1.

Fig. 1.

WITNESSES.
John H. Walker
James S. McCarter

INVENTOR.
George W. Bell.

G. W. BELL.
PNEUMATIC ANTIVIBRATION DEVICE FOR AUTOMOBILES.
APPLICATION FILED OCT. 14, 1910.

1,120,011.

Patented Dec. 8, 1914.
8 SHEETS—SHEET 2.

WITNESSES.
John H. Walker
James S. McCarter

INVENTOR.
George W. Bell.

G. W. BELL.
PNEUMATIC ANTIVIBRATION DEVICE FOR AUTOMOBILES.
APPLICATION FILED OCT. 14, 1910.

1,120,011.

Patented Dec. 8, 1914.
8 SHEETS—SHEET 4.

WITNESSES.
John H. Walker
James H. Carter

INVENTOR.
George W. Bell

G. W. BELL.
PNEUMATIC ANTIVIBRATION DEVICE FOR AUTOMOBILES.
APPLICATION FILED OCT. 14, 1910.

1,120,011.

Patented Dec. 8, 1914.
8 SHEETS—SHEET 6.

Fig. 12.

WITNESSES.
John H. Walker
James S. McCarter

INVENTOR.
George W. Bell.

Fig. 13.

UNITED STATES PATENT OFFICE.

GEORGE WILLIAM BELL, OF LIVERPOOL, ENGLAND.

PNEUMATIC ANTIVIBRATION DEVICE FOR AUTOMOBILES.

1,120,011. Specification of Letters Patent. Patented Dec. 8, 1914.

Application filed October 14, 1910. Serial No. 587,142.

*To all whom it may concern:*

Be it known that I, GEORGE WILLIAM BELL, a subject of the King of England, residing at 97 Newsham Drive, Liverpool, in the county of Lancaster, England, have invented certain new and useful Improvements in or Connected with Pneumatic Antivibration Devices for Automobiles, of which the following is a specification.

This invention relates to anti-vibration devices of the piston or plunger and cylinder type, as applied to vehicles and has for its objects to assist in maintaining the piston or plunger airtight in its cylinder; to lubricate the device, to provide simple and accessible means of automatically controlling the pressure and the volume of air in the said device to the variation of the load without being affected by the average road shock and vibration; such automatic control therefore maintaining the piston in the cylinder of the device in a predetermined position, and exerting a practically constant resistance during vibration of undulatory movement of the axles or wheels, so that any change in the load automatically causes the pressure to be regulated to meet the said variation. Furthermore to restore the piston to its normal position of suspension, and further to regulate the degree of cushioning at predetermined positions of the displacement, so that the suspension shall be "sensitive" to the absorption of small irregularities of the road surface, and at the same time prevent concussion or shock should the vehicle meet with obstructions which would necessitate a larger displacement than that provided in the device for its absorption, and also prevent shock due to sudden collapse of the air pressure sustaining the load in the device from any cause.

My invention is shown in the accompanying drawings, in which—

Like characters of reference denote like parts.

Referring first to Figs. 1 to 4 wherein one arrangement of my invention is illustrated, to provide a simple form of construction of both axle and the respective parts and elements of the hub, and at the same time afford a quick method of readily detaching the wheel from the axle, the upper and lower portions of the cylinders are cast integral with one another. I provide an axle 3 each end of which is adapted to receive a piston which has a hollow cross boss 4, into which the axle 3 accurately fits, the piston being prevented from rotation by means of a key 6. In order that the piston may be held securely in its correct position endwise, I provide sleeves $8^a$, which also act as slipper blocks in guides 8 of the cylinder trunnions 7. The inside sleeve $8^a$ presses against a dust plate $9^b$ covering the slot or guide opening. The sleeve $8^a$ is provided on the outside with flat vertical faces sliding on the guides 8; at the lower part there are ports 19 communicating with the lower end of the cylinder 2, through which oil escaping from the cylinder 2 may fall into a reservoir 21. The outer end of the axle 3 is provided with a nut 5 securing the sleeve $8^a$ to the piston, and therefore holding the wheel 12 on the axle 3. The guides 8 in which the sleeves $8^a$ slide are independent members in the form of castings fitting into the bore of the trunnions 7. Each guide 8 is held in correct parallel alinement with the cylinder 2 by means of stud bolts $8^b$, passing through the body of the guide 8 on opposite sides of the slot, and screwed into the body of the cylinder 2. These guides may also perform the function of providing end thrust bearings, or where ball races are used, lock the same on the outside of the hub, by means of a projecting flange, which extends over the face of the ball races, and, as regards the inside ball race, this guide and locking means may have cast as part of it, a plate or disk 8ᶜ, against which a dust plate 9ᵇ covering the slot or guide passage, through which the axle extends, rubs and oscillates. The sleeve or slippers 8ᵃ are able to find correct alinement in the guides 8, by adjustment on the axle 3. The hub portion of the wheel rotates on bush bearing 10 sleeved on the trunnions 7. Access to the interior of the hub or wheel center 9 is obtainable by the removal of one of the side plates 9ᵃ of the same, which are secured and held concentrically on the hub 9 by bolts 11; 12 represents a wheel. Piston 1 is provided on its lower end with suitable packing 13 preferably of the cup leather type which packing is held in position by a washer 14. The opposite or upper face of the piston forms with the upper portion of the cylinder two oppositely-active dash-pots for absorbing shock due to excessive rebound of the parts when the wheel passes over obstructions in the road, one of said dashpots also constituting a pump for circulating oil. Said dashpots are formed by an extension of reduced diameter, preferably integral with the main piston disposed within a cylinder 16 formed in the cap 34 of the cylinder 2. The dashpot formed by the annular space between the piston 1ᵃ and the walls of the cylinder 2, is utilized as a force chamber to circulate the oil to the piston packing or cup leather 13, in a manner hereinafter described, and the chamber formed by the piston 1ᵃ and the cylinder 16, is utilized for absorbing the energy of rebound, by virtue of confining air in the same, as the piston 1ᵃ rises in the cylinder 16, and closes the ports 17, normally in free communication with the atmosphere; the ports being so arranged as to enable sufficient energy to be expended on circulating oil that may be contained in the annular dash pot A, before the piston is brought to rest by the compression of the air in dash pot B. The lubricant falls by gravity through the port 19 above described, into a space 20 (see Fig. 3) formed by the walls 21ᵃ of the reservoir 21 and the cylinder 2. In communication with the reservoir 21 is a tube 23 (see Fig. 1) communicating with dashpot A and provided with a check-valve 24. I also provide in the piston 1 and passing from the upper face in the dashpot A, a tube 25 establishing communication and extending between the upper and lower faces of piston 1, said tube being provided with a check-valve 26 so arranged as to allow oil to pass from the top of the piston to the lower end thereof. At this lower end are provided one or more oil-grooves 27. The lower face of the piston 1 is provided with a centrally disposed aperture 28, affording air communication between the interior of the piston 1 and the cylinder 2, and also an air reservoir 29 connected therewith, as by a pipe 57 (see Figs. 2 and 4.) At the bottom of the cylinder, I provide a tube 30 concentric with the said cylinder and extending from the bottom of the latter into the aperture 28 of the piston 1. This tube is arranged to have its lower portion 30 accurately telescope with wall 28ᵃ of the aperture 28, the upper portion of said tube forming a ferrule 31 of lesser diameter, and connected to the lower and larger diameter portion 30 at a shoulder 32. On the outer face of the tube 30, I provide one or more vertical conduits 33 (see Fig. 1) to give vent to air and oil from the annular space C formed by the wall of the cylinder 2 and said tube 30, when the piston 1 descends to the lower portion of its stroke, such oil escaping through the conduits 33 and lodging in the space 28 or inside the lower face of the piston 1. To increase the volume of air contained in the piston 1 and cylinder 2 of the device, the reservoir 29 communicates with the said piston and cylinder through the tube 30 and ferrule 31, and passages 35 and 36 formed in the bottom-cap 37, which is secured to the cylinder 2 and made airtight by a flange-joint 38, see Fig. 1. The reservoir 29 is in this case formed of cylindrical shells 39 disposed in the plane of the wheel in such manner that the outer hub 9 may incase the same. The cylinders 39 are secured to the false bottom 37 in the opening 40 by bolts 41 and caps 42, the latter being made tight by means of a flange-joint 43, see Fig. 1. In order to provide means of renewing or supplying the proper amount of oil (in those cases in which there is no oil forced automatically to the front or high-pressure side of the piston packing) to the annular space or dashpot C, without in any way taking the hub or cylinder apart, I provide a filling-conduit 44 discharging through opening 45ᵃ (see Fig. 3) near the upper end of the tube 30 into the annular space or dashpot C. To insure that the proper level of oil may be maintained in the said dashpot, I provide an overflow conduit 45 communicating with the dashpot C at a level governed by the quantity of oil to be maintained therein. These conduits 44 and 45 are provided at their lower extremities with air tight screw plugs 46 and 47.

Figure 4:
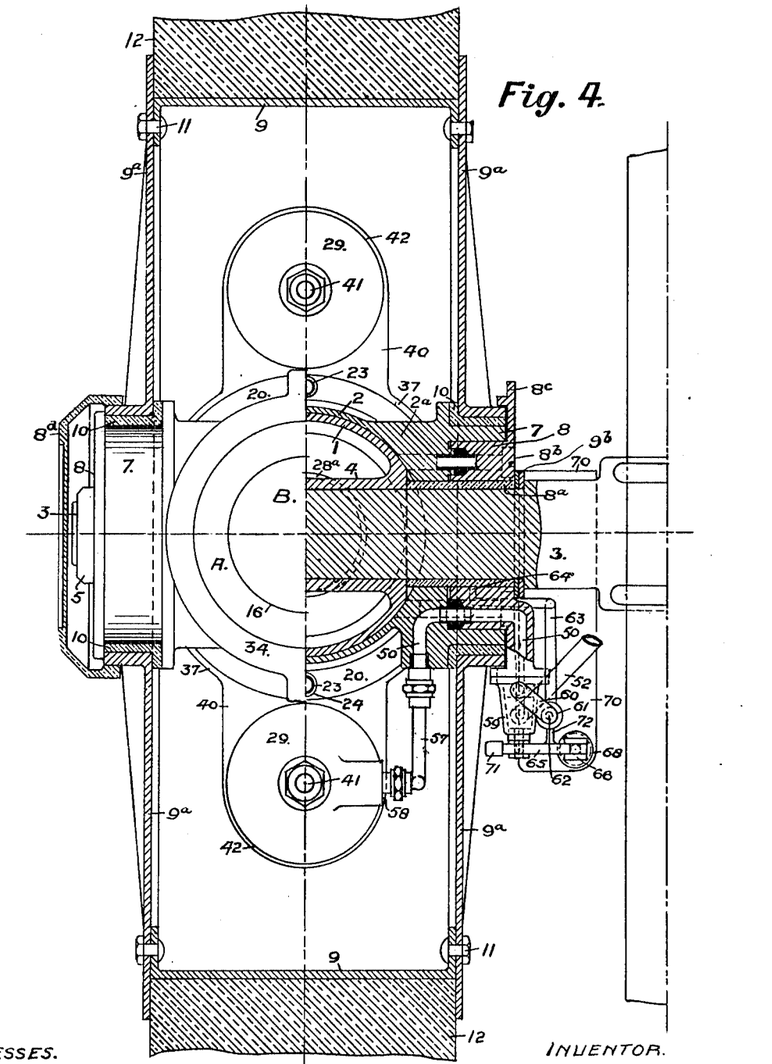
Fig. 4 is a sectional plan of Figs. 1 and 2.

To inflate the suspension device, air under pressure may be supplied from any convenient source. The compressed air from the pump being preferably supplied to a reservoir from which the suspension devices of the vehicle are supplied with air, as required. Provision may be made for automatically unloading the air compressor, when the air in the tank reaches its normal pressure and putting it into action again when the pressure in the tank falls a predetermined amount. In lieu of the above, I may utilize the pressure of the exhaust gases from the engine. To make satisfactory air tight connection to the said device, in the plane of the wheel, from the source of supply, and at the same time permit of the wheel being taken off its axle without the difficulty, when replacing it, of re-making the air tight joints between the piston and stub axle, I provide an air duct or conduit 50, (see Fig. 4) passing through the guide block 8, and terminating at the face of the plate 8ᶜ to enable a valve 59 and flexible air-supply pipe 52 to be readily attached and detached by a union joint 53. At the inner end of the conduit 50 I provide a gland 64 between said guide block 8 and cylinder 2ᵃ or reservoir wall into which suitable packing is disposed. A similar gland may also be provided, if necessary, on the opposite side of the guide slot, as shown in Fig. 4, to enable an even pressure being made on the gland to make same air tight by the bolts 8ᵇ, which secure the guide blocks in position; one of the glands only may be used for the air connection; the other being blank. To establish communication between said conduit 50 and the device or air-supply reservoir 29, I provide a tube or conduit 57 having union connections adapted to connect the conduits 50 with an opening in a boss 58 of the cap 42.

Figures 2, 3:
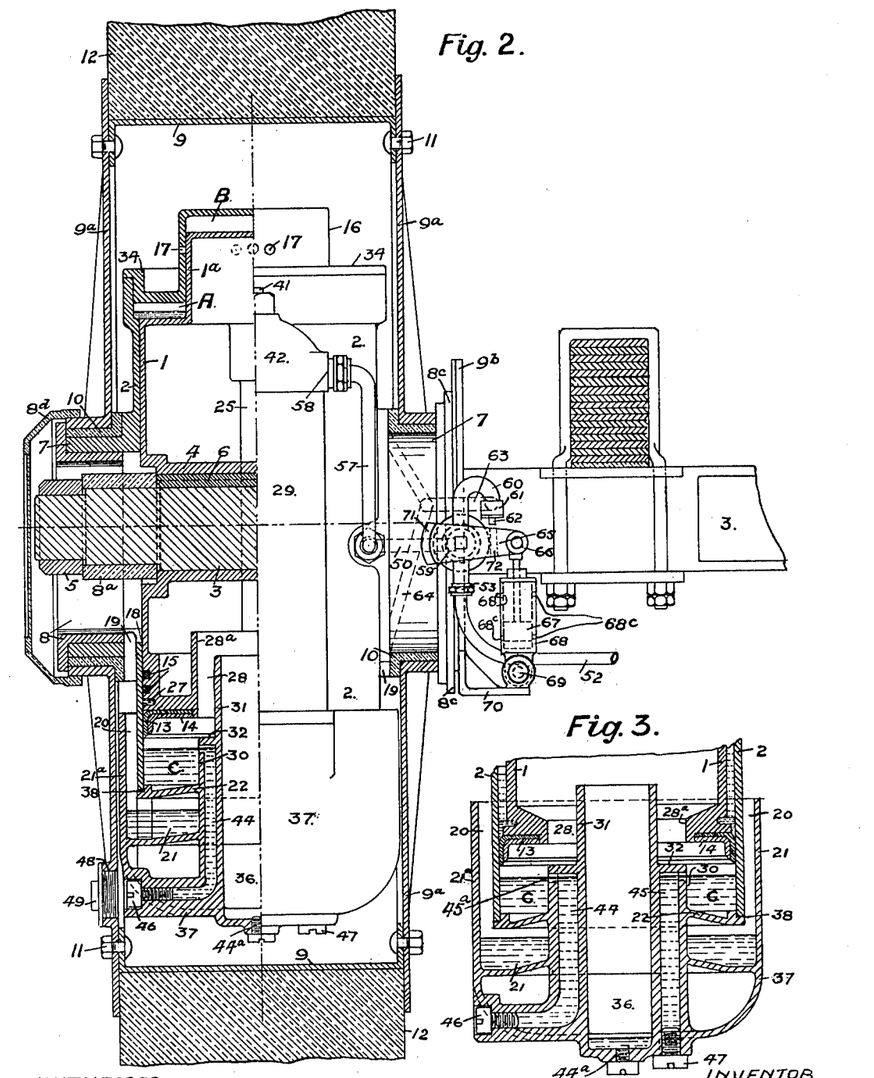
Fig. 2 is a cross vertical section, viewed at right angles to Fig. 1.
Fig. 3 is a detail of the lower part of cylinder, shown in Figs. 1 and 2.

According to a further part of my invention, to automatically control (or self regulate) the pressure of air contained in the supporting devices, I provide a control valve attached to the outside periphery of the guide block plate 8ᶜ. This valve is of the plug type to which air is supplied through a flexible tube 52. The air passes through an aperture in the plug and through conduit 50 to the cylinder. On the conduit 50 and behind the valve 59 a vent or escape branch 60 is disposed terminating with a suitable air release valve 61, which may be opened by forcing upward a spindle 62, thereby allowing air to escape from the device. Such air may escape direct to the atmosphere, or, where oil may also escape from the device, it may be conducted through a conduit 63 communicating with the atmosphere-side of the valve and the face of the guide block 8, down which the oil may pass through a groove 64 to the port 19 in the lower piston and thence to the oil reservoir 21 as shown in Figs. 2 and 4. In order to operate the valve, the plug has a lever arm 65 attached at one end by means of a link 66 to a piston 67 operating in a cylinder 68, which is pivoted at 69 to a bracket 70 integral with the dust plate 9ᵇ, which is rigidly attached to the axle 3. The cylinder 68 may have air vents 68ᶜ at its upper and lower ends for the purpose of cushioning the piston in its stroke after the latter covers such openings. At the opposite end of the lever 65 a counterweight 71 on the lever balances the weight of the other end of the arm and the piston rod connected thereto. Disposed on the lever 65 is a projection 72 for the purpose of opening the valve 61 by coming in contact with the spindle 62 when the axle 3 rises in the cylinder 2 above its normal position of suspension.

Figure 1:
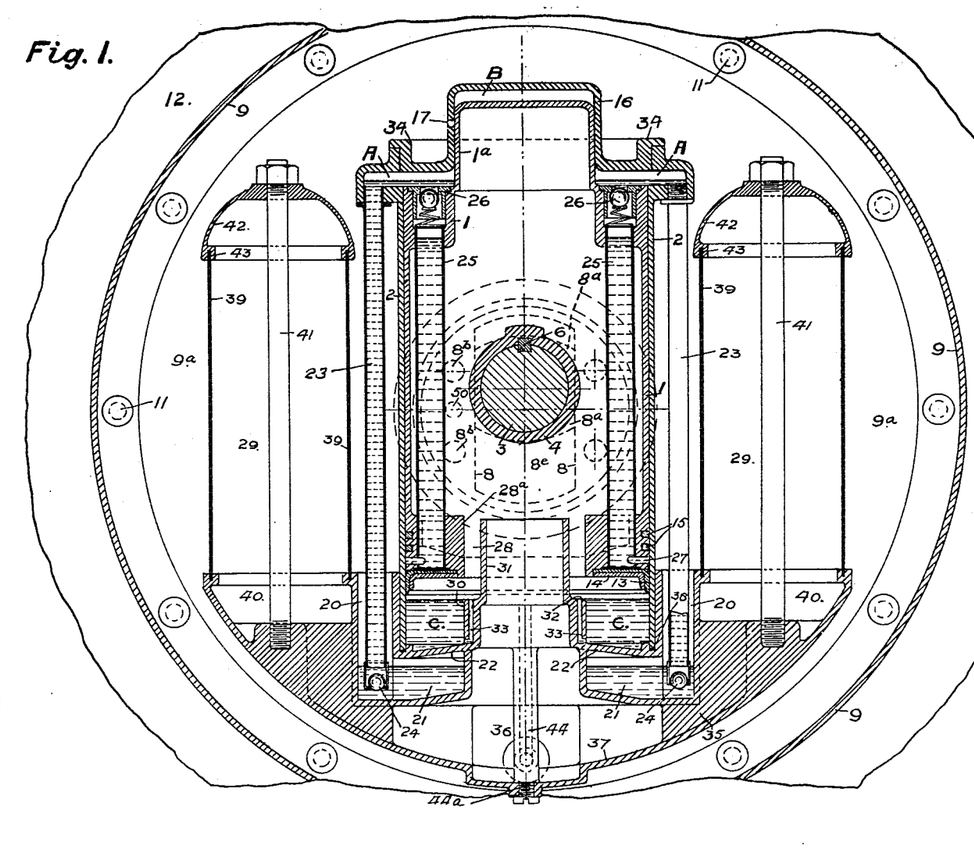
Figure 1 is a longitudinal section of a "suspension" of the type hereinbefore described, adapted to be disposed in the plane of the wheel of the vehicle.

In operating, assuming that the oil reservoir suction pipe 23 and oil ducts are filled with oil to the levels shown in the drawing, that the piston carrying the vehicle and load is suspended in the cylinder by air therein under the required pressure, and that the wheel meets an obstruction on the road, the piston 1 will descend in the cylinder and a partial vacuum is formed in the dash pot or oil pump A. Oil is then caused to flow from the reservoir 21 into said tube past the check-valve 24 and over the top of the piston in the dashpot A. On the rebound or return stroke of the piston, the check valve 24 is closed, and oil then in the dash pot is forced through the check-valve 26, to the groove 27 back of the cup leather. Any excess pressure is balanced by the action of the dashpot B, the air ports 17 being so located as to insure that pressure is exercised on the oil or lubricating fluid contained in the dashpot A. As the piston operates in the cylinder 2, the oil is worked out from between the piston and cylinder at point 18, where it meets the oil which may have escaped from the upper face of the piston, the whole being collected at the lower portion of the slot, and gravitating through the port 19 and opening 20 into the reservoir 21 whence it is again circulated through the suction pipe 23 and valve 24 to the dash pot A by repeated oscillations of the piston.

An orifice 45ᵃ is provided from which the oil may be withdrawn or supplied to the reservoir.

When the device is deflated, the piston will lie at the bottom of the cylinder, and the cup leather packing will then be immersed in the oil contained in the annular space C, thereby preserving the same. When the vehicle is in motion, and the device is automatically inflated and in operation, with the piston in its normal position of suspension, any small displacement of piston 1 within cylinder 2 will not materially increase the normal pressure of the air supporting the load. The suspension is, therefore, operating under the most sensitive condition, within a zone of displacement limited by the distance the piston may descend in its stroke or by throttling the air passage from the annular space C, as the wall 28ᵃ begins to telescope with the tube 30, the passage becoming more restricted as the piston descends, until finally the annular space C is cut off from the interior of the piston, cylinder or reservoir, and the pressure of air confined in the annular space C therefore, rises more rapidly due to the diminished space and acts as a supplementary dash pot coming finally into operation to prevent final concussion, should the vehicle meet with considerable shock, or should the device become deflated through leakage. By providing the small vents 33 adjacent the periphery of the piston, the confined air may slowly escape, and if the impetus be great enough to cause the piston to be forced to the lowest position of its stroke, the shock may be finally dissipated on the oil located at the bottom of the annular chamber C, by forcing the same through said vent or holes, which oil, when the piston resumes its normal position will return by gravity to the annular chamber C. When the device is deflated and the lower face of the piston rests in the oil in the dash pot C, and air is then supplied to the device for inflation, the incoming pressure of air will be effectively exerted on the full area of the piston through the vents 33.

Referring now to the operation of the automatic control valve for regulating the supply of air to and from the device when the latter is deflated, or when there is insufficient air pressure in same to support the load, and the axle 3 and piston 1 will consequently lie in the lower portion of the cylinder 2, the piston 67 in the control cylinder 68 rises to the upper portion of the same, closing the upper air ports 68$^c$ and comes into contact with the upper end of the cylinder 68 through the dash pot, causing the piston 67 and lever 65 attached thereto, to be drawn downward, thereby turning the plug of the valve sufficiently to open the passages to the compressed air supply and inflating the device. As the pressure rises, the axle 3 and piston 1 also rise, carrying with them by means of the dust plate 9$^b$ and bracket 70 the control cylinder 68 which owing to the frictional resistance of the valve plug 59 causes the piston 67 to descend without closing the valve-plug until the axle approaches its normal position of suspension whereupon the piston 67 having closed the lower set of ports 68$^c$ is forced upward, and the valve closed, the axle and vehicle and load being then in their normal position of suspension. When the wheel meets an obstruction in the road, and the axle and piston are caused to move in the cylinder of the device against the air pressure contained therein, the guide plate 8$^c$, with the valve 59, its lever 65, and piston 67, is free to vibrate or oscillate over a certain predetermined zone or displacement which may be controlled or regulated by the action of the dashpot at the upper end, and the annular dash pot C at the lower end of the cylinder 2, without opening the said valves 59 and 61, respectively. Should, however, there be a loss of air and the average displacement or oscillation tend to drive the piston 1 farther into the lower dash pot C, the said piston 67 will be forced toward the upper end of the cylinder 68, thus closing the air ports 68$^c$ when the piston 67 will be drawn downward together with valve lever 65, until the valve 59 is open to the supply of air. As the air pressure rises in the device, and the piston 1 tends to assume its normal position of suspension, it carries with it the valve 59 and piston 67, (still held in its open position by friction of the plug on the body of the valve) until it comes into contact with the upper dash pot of the cylinder 68 and is arrested, and the valve lever is forced down, closing the valve, which, will remain closed unless the load supported be increased. Similarly, should the load be reduced, the excess pressure of air in the device will force the piston 1 into the upper dash pot until the projection 72 on the valve-lever 65 comes into contact with the release valve spindle 62, thus opening the valve 61 and allowing the excess of air in the device to escape to the atmosphere, or if the air supply conduit communicates with the lower part of the device, allowing the excess oil also to escape; the latter being returned to the reservoir 21 through conduit 63 which discharges the same to the face of the guide 8, the oil falling down the groove 64 to the ports 19 and to the reservoir. As the air escapes and the pressure in the device is reduced, the piston 1 and axle 3 will fall to their normal position of suspension, allowing the valve 61 to close automatically.

Figure 5:
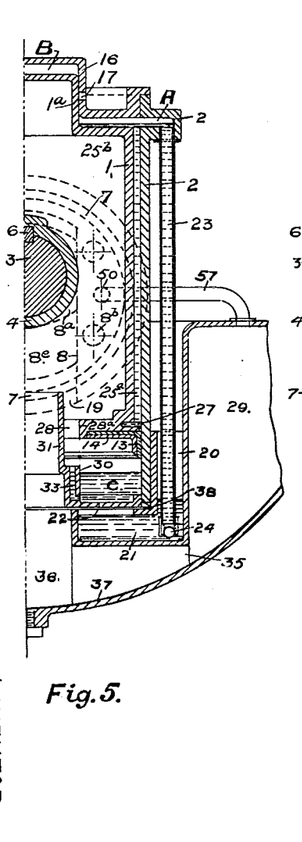
Figs. 5 and 6 are cross vertical sections similar to Fig. 1, showing modified arrangement of oil duct.

Referring to Fig. 5, a similar arrangement to Figs. 1 and 2 is illustrated, showing a modification or substitution of a vertical groove 25$^a$ located on the face of the piston, at a point on the periphery farthest from the guide slot 8$^c$, connecting the dash pot A, which also constitutes a pump, with groove 27 thereby forming a conduit for the oil passing from the dash pot to the cup leather packing, and means for lubricating the piston.

Figure 6:
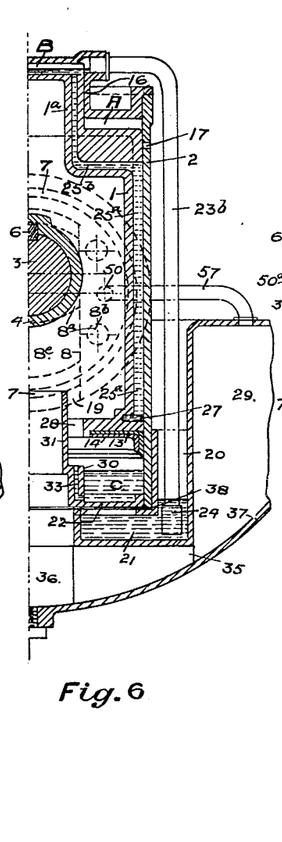

In the modification shown in Fig. 6 the dash pot B is utilized to pump oil from the reservoir 21 to the groove 27, at the back of the cup leather packing of the lower face of the piston by means of conduit 23$^b$ fitted with a valve at its lowest extremity in the oil reservoir 21, and communicating with the inner dash pot B. A conduit 25$^b$ connecting with the groove 25$^a$ in the face of the piston, is adapted to allow oil from the reservoir being drawn through foot valve 24, and conduit 23$^b$, into dash pot B, as the piston descends in the cylinder of the device, due to meeting obstructions in the road, such oil being then forced from said dash pot, by the rebound action of the piston, as it descends in its cylinder, to said groove 27 and to the back of the cup leather 13 or packing. The outer annular air dash pot is provided with ports 17 opening to the atmosphere at a suitable position, to enable unabsorbed rebound being taken up on same.

Figure 7:
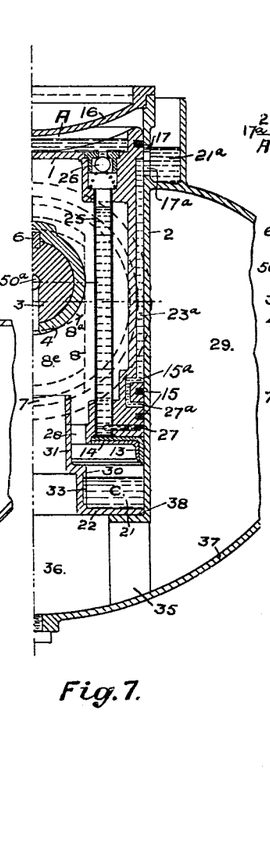
Figs. 7 and 8 are sectional elevations of the same.
Figure 8:
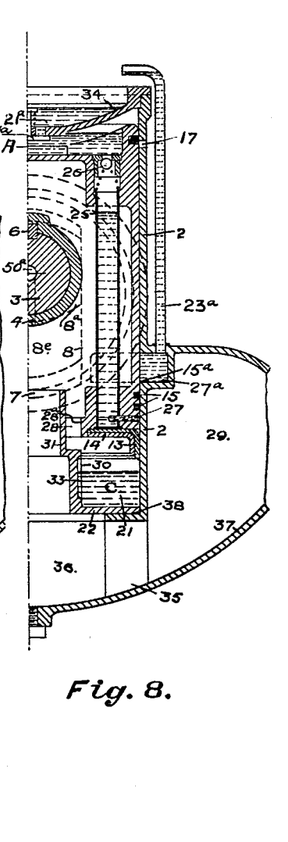

The reservoir or receiver need not necessarily be located below the point of escape of oil from immediately above the piston packing, but in some cases, may be located above, viz., at the upper end of the cylinder either on the sides of the cylinder, as shown in Fig. 7 or in the cap as shown in Fig. 8, such reservoir as shown, being in communication with one or more dash pots acting as oil pumps to circulate the oil as already described, by ports or valves 17$^a$; any oil escaping from the packing at 15$^a$ may collect in an annular closed space 27$^a$ in the face of the piston 1 or cylinder 2, and communicating with said reservoir 21$^a$ by means of ducts or grooves 23$^a$, in the face of the piston 1 or cylinder 2, or through tubes located in the body of the piston 1, or external to the cylinder 2. In this manner, oil escaping from the packing at the point 15$^a$ under pressure exerted by the upward rebound of the piston 1 in the oil circulating dash pot A or dash pots, on its upward stroke, may be forced to the said reservoir 21$^a$, and be again drawn into the dash pot or pump A through ports or valves 17$^a$, on the downward stroke of the piston to be circulated as described.

Figure 9:
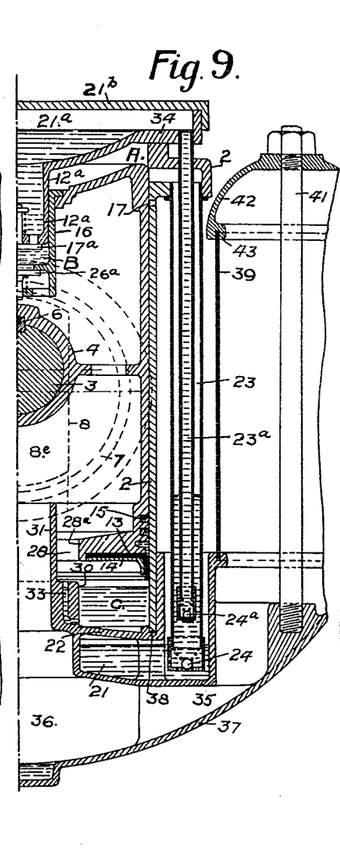
Figs. 9 and 10 are sections similar to Fig. 1 showing modified arrangements for returning oil to the piston packing from the reservoir.

Referring to Fig. 9, this figure illustrates a modified suspension device wherein the piston supports the vehicle and load on air under pressure in cylinder 2 of the device, such load being supported by the piston by means of axle 3 resting in sleeve 4. The dash pot between the upper face of piston 1 and cylinder 2, is divided into two dash pots A and B, which also constitute pump or pumps, the upper portion of the cylinder or cap 34 being concave and capable of forming a reservoir for oil. Disposed at the opposite end of the cylinder, and below the floor of the same, I provide an oil reservoir 21. Communicating between the lower oil reservoir 21 and the outer annular dash pot A, I provide a tube or conduit 23 forming an oil receiver, such tube 23 being fitted with a check-valve 24 located at the lowest extremity, and at the lower part of the reservoir 21. Disposed in the said tube 23 and communicating with the lower extremity thereof, through valve 24$^a$, is a tube 23$^a$ communicating with reservoir 21$^a$. In the upper face of the piston there is provided the cylinder 16 preferably screwed into piston 1 to form the inner dash pot B; a piston 12$^a$, integral with the cap 34, forming the upper reservoir 21$^a$, is provided to operate in the inner dash pot cylinder 16, such piston having free communication through the same, and a check-valve 17$^a$ located in its face, to the inner dash pot or pump B. A spring-controlled delivery valve 26$^a$ is provided in the lower face of the cylinder 16, which valve is adapted to allow oil being forced from said dash pot B, to the inside of the piston or pressure side of the cup leather packing 13. Communicating with the upper oil reservoir 21$^a$, I provide a duct or conduit leading from the upper oil reservoir 21$^a$, to any desired point, in the upper part of the cylinder 2, adapted to admit oil for lubrication purposes to the oil grooves in the upper portion of the piston face. Air ports 17 are provided in wall of cylinder 2 to admit of the air in the outer annular dash pot being cut off from the atmosphere for the purpose of cushioning. In the lower portion of the cylinder, the tube 30 telescopes with the sleeve 28$^a$, for the purpose of forming an annular dash pot C, between the lower wall of cylinder 2, and the said tube for the purpose specified. In operation, as the piston 1 descends in its cylinder 2 due to obstruction on the road, a partial vacuum is created in the outer dash pot A, causing oil in the lower reservoir 21 to be drawn into the tube or receiver 23, through a valve 24; on the rebound of the piston in the cylinder, piston 1 rises, until the air port 17 is cut off, the remaining air in the dash pot and tube or receiver 23, communicating therewith, being compressed forcing oil from the receiver 23 into the connecting pipe 23$^a$, through a valve 24$^a$ located on its lowest extremity, to reservoir 21$^a$, located above the inner dash pot or pump B. The oil in the reservoir 21$^a$, being in communication with the dash pot or pump B through valves 17$^a$, when piston 1 descends in cylinder 2, oil is drawn through said valve into dash pot or pump B from the reservoir 21$^a$, and as the piston rises the oil contained therein is forced through the delivery valve 26$^a$, located in the lower face of the dash pot cylinder 16 to the inner or pressure side of piston packing 13, or to the inside of the device, such oil falling from the delivery valve over the sleeve 4 of the axle to the space formed by the lower portion of piston 1. The oil falls by gravity to the lower portion of the annular dash pot C, when the piston is in its normal position of suspension; the level of the oil in the annular dash pot C may be maintained, if desired, at a level sufficiently high as to constantly immerse the cup, leather or the lower face of the piston or packing; under such circumstances, sufficient space is provided to allow of the oil being freely forced by the descending piston into such passage, until cut off at the desired point by the telescoping of the tube 30, by sleeve 28$^a$, when the oil in the dash pot C, is forced through the restricted orifices or vents 33, into the annular space in lower part of piston thereby cushioning and bringing the piston to rest: on the rebound, the oil again flows from the lower part of the piston back to the annular dash pot C in the manner described. As the piston 1 oscillates in cylinder 2 against the pressure of air contained therein, such oil as may escape past the cup leather or packing or grooves, in the piston wall, will collect in the lower portion of the space $8^e$ formed by the guides and pass therefrom to the lower reservoir 21, where it is again circulated as described. I prefer, however, to maintain the level of oil in the bottom of cylinder 2, by limiting the amount of oil in the cycle so as to insure the level being maintained at a point that will enable a certain volume of air to be disposed between the lower face of the piston 1 and the said oil level, or by providing suitable apertures in the tube 30 at the required level, thereby allowing any excess of oil to overflow and fall to the lower part of the air passages or reservoir 36, from whence it may be withdrawn from the device with the excess of air by a self-regulating valve, hereinafter more fully described.

Figure 10:
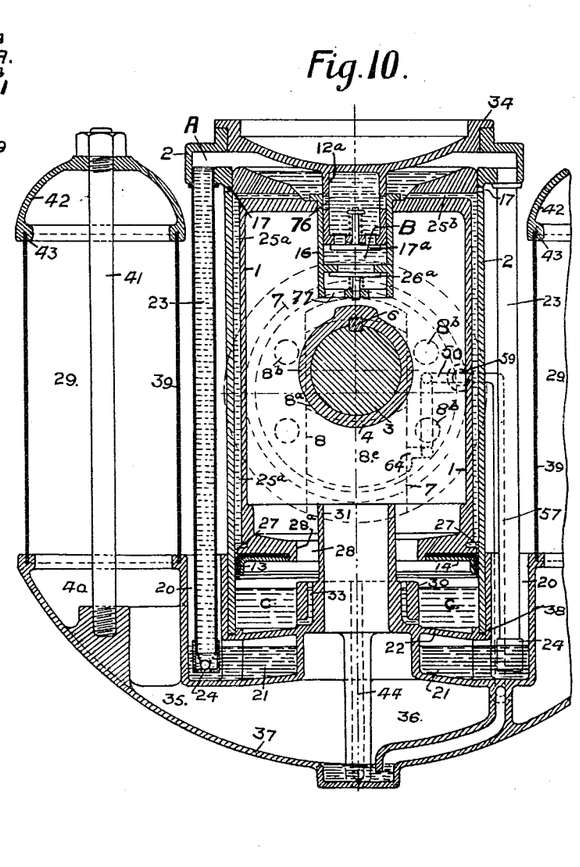

Fig. 10 shows a similar device to that shown in Fig. 9 wherein provision is made for supplying oil to the back of the cup leather or packing of the lower face of the piston and to the front or pressure side of the cup leather or packing of same, simultaneously, by the action of piston 1 in the cylinder 2 of the device. The tube 30 forms a conduit to connect the interior of the piston and cylinder of the device to that of the air reservoir 29. The upper dash pot is divided into two parts, an outer annular part A and an inner part B, the outer dash pot A connected by means of tubes 23 fitted with a check-valve 24 at its lower extremities and communicating with the lower portion of the oil reservoir 21, adapted to admit oil from said reservoir to the outer annular dash pot A. In the piston is provided a cylinder 16, forming with the piston $12^a$ the inner dash pot or pump B. In the upper walls of the piston $12^a$ there are provided ports or apertures 76 communicating with the outer annular dash pot A and the inside of the piston $12^a$. On the lower face of the latter I provide an oil inlet valve $17^e$ permitting communication from the inside of piston $12^a$ to the inside of the dash pot or pump B. There is a delivery valve $26^a$ in the lower face of the cylinder 16 of the dash pot, adapted to allow oil being forced from the dash pot or pump B to the pressure side of the cup leather or packing; or into the device. Communicating with the lower portion of the outer annular dash pot A there is provided a passage $25^b$ and groove $25^a$ down the face of the piston. In action, as piston 1 descends in cylinder 2, a partial vacuum is created in the outer annular dash pot A, causing oil to be drawn from the reservoir 21, through the foot valve 24 and tube or conduit 23, to said dash pot A. The oil collects in the lower portion of the upper face of piston 1, and passes through apertures 76 in the piston $12^a$ of dash pot or pump B, through the valve $17^a$ and also through passages $25^b$ and groove $25^a$ to the groove 27 behind the cup leather or packing. As the piston 1 rises in cylinder 2 of the device, due to rebound, the oil contained in the inner dash pot B is forced into the pressure side of the cup leather or packing through valves $26^a$ and apertures 77 to the lower part of cylinder 2 in the manner described with reference to Fig. 9, and the oil in dash pot A is forced to the grooves 27 behind the cup leather by the increased pressure of air in said dash pot being exerted on the surface of the oil as the piston rises and cuts off the air ports 17, the upper peripheral face of the piston having small vertical grooves permitting the escape of such air slowly from the dash pot A to the port or ports 17, so that when the piston descends quickly sufficient rarefaction takes place in said annular dash pot A to enable oil to be raised or pumped from the reservoir 21 in the manner described.

Figure 11:
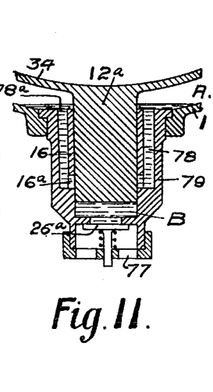
Fig. 11 is a detail of the same.

Referring to Fig. 11 an alternative design of the inner dash pot, which also constitutes a pump B, is shown. In this arrangement the cylinder 16 is surrounded by an annular space 78 formed by a cylinder 79, which is integral with cylinder 16, and is disposed in the piston 1 and secured to the face thereof. Disposed within the cylinder 16, and operating in same there is disposed a solid piston $12^a$ integral with the cap or upper end of the cylinder 2 or cap 34 of the device. In the wall of cylinder 16, and communicating with the passage 78 there is provided a port adapted to allow oil to pass into the lower portion of the cylinder 16 of the dash pot when the piston 1 descends to a certain position in the cylinder 2. On the upward stroke the oil contained in the lower part of cylinder 16 of the dash pot B, is forced to the pressure side of cup leather or packing disposed on the lower face of piston 1 through the delivery valve $26^a$ and openings 77, in the manner already described in connection with Fig. 9.

Figure 12:
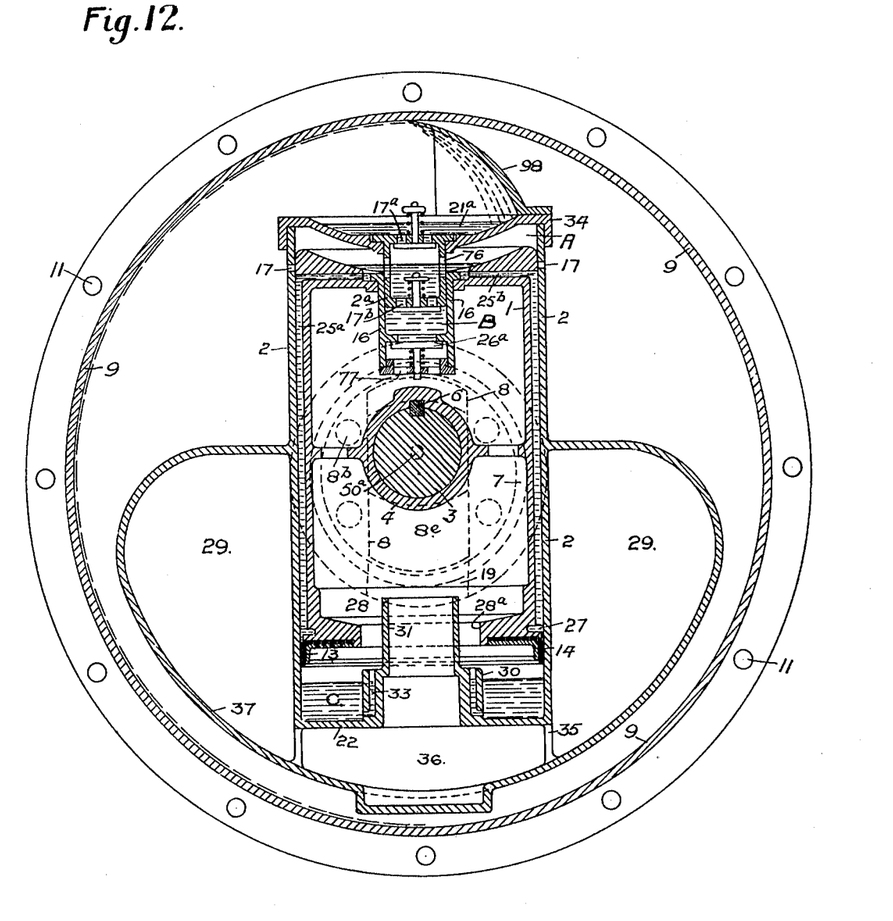
Figs. 12 and 13 are similar sections to Figs. 1 and 2 showing modified form of "suspension" located in the plane of the wheel, wherein oil is circulated to the front or high pressure side of the piston packing.
Figure 13:
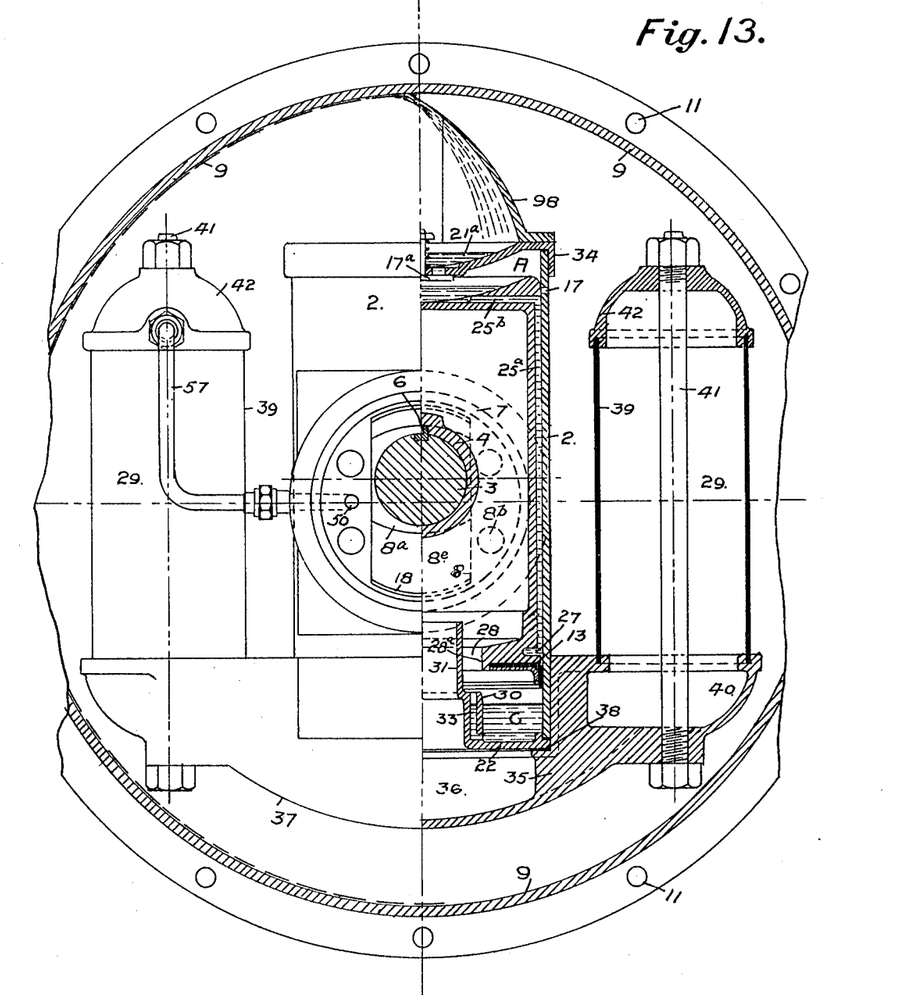

Referring to Figs. 12 and 13, the cylinder is located in the plane of the wheel and the dash pot formed by the outer portion of the piston and cylinder is divided into two parts A and B. The inner dash pot which also constitutes a pump, is formed by a cylinder 16 disposed in and secured to the upper face of the piston and having at its lower extremity a delivery valve $26^a$ adapted to allow oil to be forced from said dash pot or pump B to the pressure-side of the packing of the piston. In the upper end of the cylinder 2, I provide a concave cap 34 forming a reservoir 21ª for oil and having at its lower extremity a piston 12ª adapted to operate in the cylinder 16 of dash pot or pump B. In the upper end of said piston and communicating with the reservoir 21ª and the outer dash pot A, there is provided a valve 17ª. At the lower extremity of said piston a second valve 17ᵇ is provided adapted to allow oil to pass from the outer annular dash pot A through ports 76 and the body of said piston and valve 17ᵇ to the dash pot or pump B. Communicating with the outer dash pot A are passages 25ᵇ and grooves 25ª through which oil passes to the groove 27 at the back of the cup leather or packing. In the bottom 22 of the cylinder 2, there is provided a tube 30 adapted to engage with sleeve 28ª of passage 28 in the piston which forms thereby an annular dash pot C between the bottom 22 and face of piston. The tube is also adapted to form a free passage between the volume of air contained in the piston and cylinder and that contained in the reservoirs 29 disposed on either side of the cylinder 2. Said reservoir 29 is integral with the cylinder 2 and in communication with a passage formed by the tube, through passage 36 and ports 35 formed between the bottom 22 of the cylinder 2 and the outer wall of the air reservoir 29. In the cylindrical trunnions 7, guides 8 are provided to constrain the piston 1 in its cylinder 2. At the lower part of the slot 8ᵉ, there are ports 19 communicating with the lower outside portion of the cylinder 2 through which oil escaping from the piston and cylinder 2 of the device may collect and fall into the outer revolving hub 9. The oil adhering to the inner peripheral surface is carried to the upper end of the cylinder 2 where it is scraped off into the reservoir 21ª by a scraper 98. In operation, as the piston 1 descends in the cylinder 2, oil is drawn into the outer annular dash pot A by the partial vacuum formed therein through the valve 17ª and ports 76 and also into inner dash pot B through the valve 17ᵇ located in the lower face of the dash pot piston B. On the rebound of the piston 1, the oil contained in the inner dash pot or pump B is forced through the delivery valve 26ª to the pressure side of the cup leather 13 or packing through openings 77 to the bottom of the dash pot C. The oil in the outer dash pot A is simultaneously forced as the pressure rises through the passages 25ᵇ and ducts 25ª to the oil groove 27 at the back of the cup leather or packing on the lower face of piston 1. The oil escaping from the front and back of the packing from between the piston and the cylinder, together with oil that may escape from the upper portion of the piston 1 and collecting in the lower portion of the hub or slot 8ᵉ, passes through ports 19 down the outside of cylinder 2, falling into the outer hub 9 and being thereafter carried to the upper end of cylinder 2 by the revolving hub, where it is scraped into the reservoir 21ª by scraper 98, to be again circulated in the manner described. In order that the suspension device shall be "sensitive" to small obstructions met with on the road the augmenting volume of air contained in the reservoir 29 has free and unobstructed communication with the volume of air contained in the piston 1 and cylinder 2 of the device through the tube 30 and ports 35, so admitting of rapid influx and efflux of the air to and from the device to the reservoir 29 "wiredrawing" the same. Should the obstructions met by the wheel be great enough to drive the piston sufficiently far down cylinder 2 to cause the tube 30 to engage and telescope with the sleeve 28ª, the retarding pressure exerted on the lower face of the piston 1 will be increased by the action of the dash pot C, thus bringing the same to rest without shock or concussion, as described.

Referring to the modification Fig. 13, in this arrangement as in that shown in Fig. 12 the device is located in the plane of the wheel, and is incased by the hub 9 revolving on the trunnions 7. At the upper ends of the piston 1 and cylinder 2 there is provided a single dash pot formed by the upper face of piston 1 and the concave cap 34 which is in communication with said dash pot through a valve 17ª located at the bottom of the reservoir 21ª, said dash pot also being in communication with the back of the cup leather 13 of the piston 1 by passages 25ᵇ and ducts or grooves 25ª on the face of the piston 1. At the lower end of the cylinder 2 there is also provided a tube 30, which forms the bottom 22 of the cylinder 2 and dash pot C, and makes an oil and air tight joint with the cylinder 2 and reservoir casing. To augment the volume of air contained in the piston and cylinder of the device, a reservoir 29 communicates with the piston and cylinder through the tube 30, and through passages 36, ports 35 and openings 40 formed preferably in the false bottom 37, which latter is secured to the cylinder 2. In operation when the piston 1 descends in the cylinder 2 against the pressure of air, a partial vacuum is created in the upper dash pot causing oil to flow from the reservoir 21ª through valve 17ª into said dash pot. On the return stroke or rebound of the piston, the valve 17ª is closed and the piston covers the air ports 17, the pressure on the passages 25ᵇ and down the vertical groove 25ª on the face of the piston, forces oil into the lower groove at the back of the cup leather 27. As the piston operates in its cylinder, the oil escaping from between the piston and cylinder at 18, together with any oil that may have collected from the upper face of the piston, finds its way through the ports 19 and falls into the outer revolving hub 9, being then carried up to the upper end of the cylinder where it is returned to the reservoir 21ª by the scraper 98 to be again circulated in the manner before described. The action of the dash pot C is similar in every respect to the operation described in connection with Fig. 12.

Figure 14:
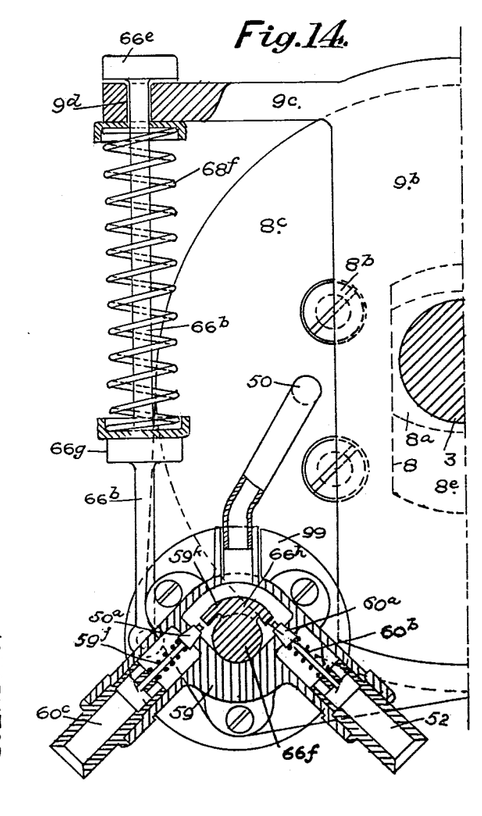
Figs. 14 and 15 represent details of self regulating valve controlling the supply of air to and the escape of air from the device.
Figure 15:
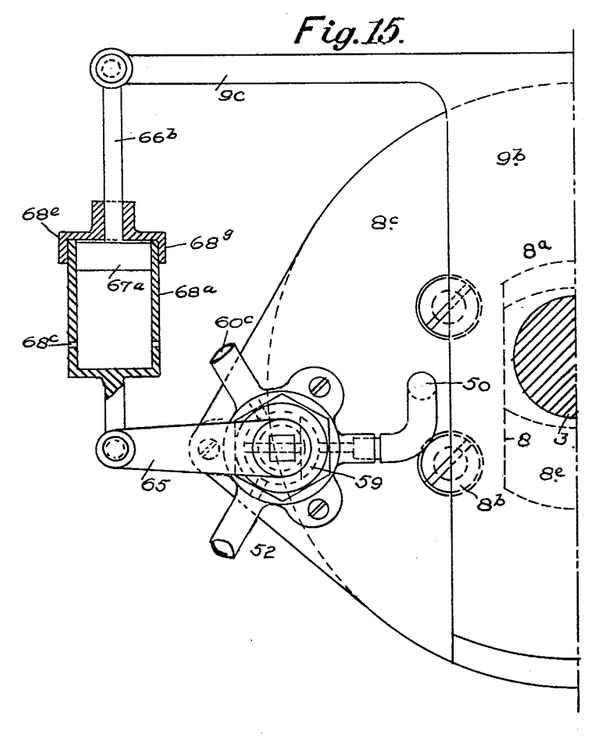

As a modification of the valve arrangement in connection with my invention, I may provide a rotary type of valve which may be attached to one of the members of the suspension device, in any suitable manner, and be actuated by the other (see Fig. 15). The body of said valve is provided with three connections or openings, one with the device, and one with the source of supply, while the other permits escape of air from the device. The plug of the valve operating in the said body is provided with a suitable passage arranged to allow air passing to the device when the valve plug is moved in one direction, and when moved in the opposite direction to allow air in the device to escape through the passage provided in the body of the valve being made with a minimum rotation of the valve plug. To maintain the plug air tight in the valve body a suitable gland and packing are provided. In order that the valve plug may close the escape passage as the piston carrying the load in the device assumes its normal position, I may provide an extension from the body or fixed part of the valve, and one from the rotary disk or plate, in such a manner as to allow a spring being held between them (see Fig. 14), such spring being fully distended when the valve is in its normal position, but being compressed when the escape valve is open. In operation when the load on the suspension is increased the cylinder of the air controlled spring compresses the air after closing the ports in the cylinder wall. When the suspension is subjected to vibration by meeting obstructions on the road, the valve is not operated owing to the pressure transmitted from the air control spring not having sufficient time to communicate motion to the valve or cock through the frictional resistance of the two rotating disks or plates during the period of the oscillation.

As a further modification of the rotary type of valve I may provide a similar valve, actuated either by an air spring as described, or by a metallic spring as shown in Fig. 14 of the drawings, having friction disks 99, fixed to rotating spindle 66ᶠ and to the body of the valve 59, such valve spindle 66ᶠ may pass through a suitable stuffing box or gland into the pressure chamber 59ᵏ of valve 59. On the spindle 66ᶠ there is a cam or tappet device 66ʰ adapted when rotated in one direction to open an inlet air valve 50ª admitting air from source of supply to the device by 52, and when rotated in the opposite direction to open a similar valve 60ª to allow air from the device to escape to the atmosphere by 60ᶜ. Said valves are provided with suitable springs 59ʲ and 60ᵇ to maintain the same on their seats. As a modification of the air control spring described I may substitute a spring 68ᶠ, disposed between an arm or extension 9ᶜ attached to the axle 3 or piston 1 of the device, and a collar or shoulder 66ᵍ of the connecting rod or spindle 66ᵇ, which actuates the valve 59 and its parts, the lower end of such spindle 66ᵇ being connected to the friction disk 99 and rotating spindle 66ᶠ of the valve 59. The upper end of such spindle 66ᵇ passes through an opening or sleeve 9ᵈ in the arm or extension 9ᶜ connected with the piston 1 of the device, and said spindle is provided at its upper end with a shoulder or head 66ᵉ adapted to engage or rest on the upper side of the arm 9ᶜ. In operation when the load is increased on piston 1, it descends in its cylinder 2, and therefore causes the arm or extension 9ᶜ to compress the spring 68ᶠ until the pressure forces the spindle 66ᵇ downward and rotates the disk 99 connected with the valve spindle 66ᵇ downward against the friction of the said disks, such motion causing the tappet 66ʰ on the spindle of the valve in the chamber of the same to come in contact with the inlet valve 50ª and raise the same from its seat against the action of the spring 59ʲ, thereby allowing air to be supplied to the suspension device in the manner already described. The valve 50ª is maintained open by the friction of the said disks until such time as it is closed by the rising piston 1 in the cylinder 2 of the suspension device, causing the arm 9ᶜ to simultaneously raise the connecting rod 66ᵇ by coming into contact with the head or collar 66ᵉ and moving the disk plate 99 back to its normal "off" position. Similarly, when the load is decreased the pressure on the supporting piston 1 of the device, forces the same to the upper portion of the cylinder 2 until arrested, the arm 9ᶜ simultaneously raising the connecting rod 66ᵇ by pressing on head or collar 66ᵉ, thereby rotating the disk 99 and spindle of the valve in the upward direction until the tappet 66ʰ raises the escape valve 60ª from its seat against the action of the valve spring and allows air to escape from the device. As the piston 1 assumes its normal position the disk 99 is rotated back by the spring 68ᶠ, and the valve 60ª is forced onto its seat and closes the escape, but not until it has assumed its normal position of suspension. Should the suspension meet with obstruction and vibration from the road, the displacement does not actuate the inlet valve, due to the retardation or sluggish action of such valve. In order that a minimum amount of movement of the valve shall take place, and the wear and tear therefore, on the air control spring be reduced when the vehicle is traveling over rough roads, the air-control spring may have the air ports contained in the walls of its cylinder located higher up the same, at the opposite end to that at which the piston normally lies when in its correct suspension, or well toward the end of the displacement as shown in Figs. 1, 2 and 4 and described. In this manner the cylinder 68$^a$ can move on its piston 67$^a$ or valve spindle 66$^b$ freely and yet may operate the air inlet valve at any predetermined position of its displacement, either by acting through the compressing of a small volume of air contained between the said piston 67$^a$ and cylinder 68$^a$ of the control spring or by actual contact between these parts without the interposition of elastic media. The characteristic features are that the supply valve 59 shall remain open due to frictional resistance on the plug or valve, until actually closed by the movement of the piston 1 of the device as it assumes its normal position of suspension, this motion being transmitted through the valve spindle 66$^b$ or connection to the valve 59; and that when such device is unloaded the excess pressure shall be immediately reduced by the movement of the said piston 1 in the device. By this arrangement the supply and escape of air from the device may be regulated proportionately to the load carried with a minimum motion of the valve.

The inlet and outlet valves need not necessarily be integral with each other but may be separate and act independently and in the manner described. It is also obvious that the valve may be attached to the piston or its parts of the suspension device and be operated by the other member of the device, viz., the cylinder or its parts, without departing from the scope of the invention.

I claim:—

1. In a device of the character described, the combination with a chassis, and wheels therefor, of pneumatic support devices interposed between said chassis and the wheels, means controlling the movement of air to the support devices, and means for operating the controlling means, operated by the relative movement of the chassis on the wheels comprising a valve operable by the vertical movement of the wheel relative to the axle for varying the air pressure in said devices.

2. In a device of the character described, the combination with an axle and wheels mounted thereon, of pneumatic support devices interposed between said axle and the wheels, and surrounded by the wheel hubs, means for regulating the air pressure in said devices, and means operated by the movement of the axle for operating the controlling means comprising a rotatable valve operable by the vertical movement of the wheel relative to the axle for varying the air pressure in said devices.

3. The combination with an axle, a wheel journaled thereon, and means for guiding the same for vertical movement relatively thereto, of a pneumatic supporting device interposed between said wheel and the axle and surrounded by the wheel hub, means for controlling and varying the air pressure in said devices, and means operated by the vertical movement of the axle and adapted to shift the air controlling means comprising a valve operable by the vertical movement of the wheel relative to the axle for varying the air pressure in said devices.

4. The combination with an axle and a wheel having a hollow hub mounted thereon, of a pneumatic device interposed between the axle and the hub and inclosed by the latter, mechanism for controlling the flow and supply of air through the pneumatic device, and means operated by the up and down movement of the axle for operating the air-controlling and supplying means adapted to be operated by variation in the load.

5. The combination with an axle and a wheel having a hollow hub mounted thereon, comprising an air cylinder and a piston operative therein and interposed between the axle and the hub and inclosed by the latter, mechanism controlling and supplying air under pressure to the cylinder, and mechanism operated by the up and down movement of the axle for operating the air supplying and controlling means adapted to be operated by variation in the load.

6. The combination with an axle and a wheel having a hollow hub mounted thereon, of a vertical air-cylinder carried by the wheel hub, a piston operative therein and carried by the axle, both being disposed in the plane of the wheel, and mechanism operated by the vertical movement of the axle and adapted to control the air supply in the cylinder comprising a valve operable by the vertical movement of the wheel relative to the axle for automatically varying the air pressure in said cylinder.

7. In a device of the character described, the combination with a chassis, and wheels therefor, of pneumatic support devices interposed between said chassis and the wheels, means for automatically varying the air pressure in said devices, comprising a valve operable by the relative movement of the wheel transversely to the axle for controlling the air pressure in said devices, and means for operating the valve adapted to be operated by variation in the load.

8. In a device of the character described, the combination with a chassis, and wheels therefor, of pneumatic support devices interposed between said chassis and the wheels, means for automatically varying the air pressure in said devices, comprising a rotatable valve for varying the air pressure in said devices, and means actuated by the vertical movement of the wheels relative to the axle adapted to control and operate the valve by variation in the load.

9. In a device of the character described, the combination with a chassis and wheels therefor, of pneumatic support devices interposed between said chassis and the wheels, each of said wheels having a hollow hub in which said pneumatic supporting devices are disposed in the plane of the wheels, means for automatically varying the air pressure in said devices, consisting of a valve casing having inlet and outlet conduits in communication with said devices, a rotatable closure member in said casing for admitting or exhausting air from said conduits, and means for operating the closure by variations in the load.

10. In a device of the character described, terposed between said chassis and the wheels, therefor, of pneumatic support devices interposed between said chassis and the wheels, means for automatically varying the air pressure in said devices, a valve casing having inlet and outlet conduits in communication with said devices, a rotatable closure member in said casing for admitting or exhausting air from said conduits, and a resilient device operated by the movement of the wheel relative to the axle for connecting said conduits to admit or exhaust air respectively.

11. The combination with an axle, and a wheel having a hollow hub mounted thereon, comprising an air cylinder and a piston operative therein and interposed between the hub and axle and inclosed by the hub, and an automatic regulator for the air pressure in said device, said regulator comprising a controller operated by the relative movement of the wheel and axle due to variations in the load.

12. The combination with an axle, and a wheel having a hollow hub mounted thereon, comprising an air cylinder and a piston operative therein and interposed between the hub and axle and inclosed by the hub, and an automatic regulator for the air pressure in said device, said regulator comprising a yielding device operated by the relative movement of the wheel and axle due to variations in the load.

13. The combination with an axle, and a wheel movable vertically relatively thereto and having a hollow hub, said axle projecting into said hub, of a vertical piston on the axle, a cylinder surrounding said piston and rotatably supporting said wheel, an air supply, conduits connecting one end of the cylinder with the air-supply and the atmosphere respectively, and means for automatically controlling said conduits adapted to be operated by variations in the load.

14. The combination with an axle, and a wheel movable vertically relatively thereto and having a hollow hub, said axle projecting into said hub, of a vertical piston on the axle, a cylinder surrounding said piston and rotatably supporting said wheel, an air supply, conduits connecting one end of the cylinder with the air supply and the atmosphere respectively, a valve mechanism controlling said conduits, and a dash-pot mechanism operated by the vertical displacement of said wheel and axle for operating said mechanism.

15. The combination with an axle, and a wheel movable vertically relatively thereto and having a hollow hub, said axle projecting into said hub, of a vertical piston on the axle, a cylinder surrounding said piston and rotatably supporting said wheel, an air supply, conduits connecting one end of the cylinder with the air supply and the atmosphere respectively, a pair of independently operable valves in said conduits respectively, and means for operating said valves.

16. The combination with an axle, and a wheel movable vertically relatively thereto and having a hollow hub, said axle projecting into said hub, of a vertical piston on the axle, a cylinder surrounding said piston and rotatably supporting said wheel, an air supply, conduits connecting the upper end of the cylinder with the air supply and the atmosphere respectively, a pair of independent operable self-closing valves in said conduits, respectively, and means for opening said valves.

17. The combination with an axle, and a wheel movable vertically relatively thereto and having a hollow hub, said axle projecting into said hub, of a vertical piston on the axle, a cylinder surrounding said piston and rotatably supporting said wheel, an air supply, conduits connecting one end of the cylinder with the air supply and the atmosphere respectively, a pair of independent operable self-closing valves in said conduits respectively, a rock-shaft having tappets for opening said valves, and means for moving said rock-shaft by the vertical displacement of said wheel and axle.

18. The combination with an axle, and a wheel movable vertically relatively thereto and having a hollow hub, said axle projecting into said hub, of a vertical piston on the axle, a cylinder surrounding said piston and rotatably supporting said wheel, an air supply, conduits connecting the upper end of the cylinder with the air supply and the atmosphere respectively, a pair of independent operable self-closing valves in said conduits respectively, a rock-shaft having tappets for opening said valves, and yielding means attached to the wheel hub and axle for moving said rock-shaft by the vertical displacement of said wheel and axle.

In testimony whereof I affix my signature in presence of two witnesses.

GEORGE WILLIAM BELL.

Witnesses:
EMILY BURNETT,
JOHN H. WALKER.